United States Patent
McCarty et al.

(10) Patent No.: US 11,328,009 B2
(45) Date of Patent: May 10, 2022

(54) AUTOMATED CONTENT GENERATION AND DELIVERY

(71) Applicant: Rovi Guides, Inc., San Jose, CA (US)

(72) Inventors: Michael McCarty, Agoura Hills, CA (US); Carla Mack, Los Angeles, CA (US)

(73) Assignee: ROVI GUIDES, INC., San Jose, CA (US)

( * ) Notice: Subject to any disclaimer, the term of this patent is extended or adjusted under 35 U.S.C. 154(b) by 27 days.

(21) Appl. No.: 16/553,337

(22) Filed: Aug. 28, 2019

(65) Prior Publication Data

US 2021/0064650 A1 Mar. 4, 2021

(51) Int. Cl.
| | |
|---|---|
| *G06F 16/48* | (2019.01) |
| *G06F 16/951* | (2019.01) |
| *G06F 40/289* | (2020.01) |
| *G06F 3/14* | (2006.01) |
| *G06F 3/16* | (2006.01) |
| *G10L 15/22* | (2006.01) |

(52) U.S. Cl.
CPC ............ *G06F 16/48* (2019.01); *G06F 3/14* (2013.01); *G06F 3/16* (2013.01); *G06F 16/951* (2019.01); *G06F 40/289* (2020.01); *G10L 15/22* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 8,977,636 | B2 * | 3/2015 | Bodin | G06F 16/84 |
| | | | | 707/756 |
| 9,405,792 | B2 * | 8/2016 | Gross | G06F 16/95 |
| 10,522,143 | B2 * | 12/2019 | Chandrasekaran | G09B 7/02 |
| 10,534,826 | B2 * | 1/2020 | Breedvelt-Schouten | |
| | | | | G06F 16/248 |
| 10,572,606 | B1 * | 2/2020 | Paley | G06F 40/295 |
| 2006/0253783 | A1 * | 11/2006 | Vronay | G06F 40/186 |
| | | | | 715/730 |
| 2007/0132767 | A1 * | 6/2007 | Wright | G06K 9/00771 |
| | | | | 345/475 |

(Continued)

OTHER PUBLICATIONS

International Search Report and Written Opinion in corresponding International Patent Application No. PCT/US2020/048187, dated Nov. 30, 2020, 14 pgs.

*Primary Examiner* — Howard Cortes
(74) *Attorney, Agent, or Firm* — Haley Guiliano LLP

(57) ABSTRACT

Automated content generation and delivery may include processing a request for story synthesis using specified content items. The request may, for example, be captured using a microphone of an electronic device and transmitted to a server device. The specified content items may be mapped to a story template. Based on the story template, other content items related to the specified content items may be retrieved from one or more content sources. The content sources may, for example, refer to websites, social media platforms, search engine results, or other data stores. A story may then be synthesized using the specified content items and the other content items, for example, by combining the specified content items and the other content items according to the story template. The synthesized story may then be output, for example, at the electronic device.

16 Claims, 8 Drawing Sheets

(56) References Cited

U.S. PATENT DOCUMENTS

| | | | |
|---|---|---|---|
| 2007/0198353 A1* | 8/2007 | Behringer | G06Q 30/0277 705/14.55 |
| 2007/0203935 A1* | 8/2007 | de Souza | G06Q 10/10 |
| 2008/0177708 A1* | 7/2008 | Ayyar | G06F 16/957 |
| 2011/0087486 A1* | 4/2011 | Schiller | G06F 40/166 704/9 |
| 2011/0246182 A1* | 10/2011 | Allen | G10L 13/033 704/9 |
| 2011/0249953 A1* | 10/2011 | Suri | H04N 9/8205 386/239 |
| 2011/0320423 A1* | 12/2011 | Gemmell | G06F 16/9535 707/706 |
| 2013/0061154 A1* | 3/2013 | Bennett | G06F 40/186 715/753 |
| 2013/0165225 A1* | 6/2013 | Fuller | A63F 13/424 463/32 |
| 2013/0174026 A1* | 7/2013 | Locke | G06F 40/166 715/254 |
| 2013/0231931 A1* | 9/2013 | Kulis | G10L 15/22 704/235 |
| 2014/0031114 A1 | 1/2014 | Davison et al. | |
| 2014/0281851 A1* | 9/2014 | McHale | G06F 40/186 715/202 |
| 2015/0033126 A1* | 1/2015 | Shin | G06F 3/0488 715/719 |
| 2015/0081449 A1 | 3/2015 | Ge et al. | |
| 2016/0064033 A1* | 3/2016 | Koul | G10L 13/10 704/270 |
| 2016/0357853 A1* | 12/2016 | Moore | G06F 16/3344 |
| 2017/0068643 A1* | 3/2017 | Shamir | G06F 40/169 |
| 2017/0132198 A1* | 5/2017 | Desai | G06F 3/16 |
| 2017/0250930 A1* | 8/2017 | Ben-Itzhak | G06F 3/011 |
| 2017/0286401 A1 | 10/2017 | He et al. | |
| 2018/0114162 A1* | 4/2018 | Rana | G06F 40/56 |
| 2018/0246486 A1* | 8/2018 | Krasadakis | G06F 21/6245 |
| 2018/0349447 A1* | 12/2018 | Maccartney | G06F 16/9535 |
| 2019/0034500 A1* | 1/2019 | Das | G06N 5/022 |
| 2019/0267005 A1* | 8/2019 | Owens | G10L 15/22 |
| 2020/0034764 A1* | 1/2020 | Panuganty | G06F 40/284 |
| 2020/0042610 A1* | 2/2020 | Boles | G06Q 30/08 |
| 2020/0117857 A1* | 4/2020 | Gnanasambandam | G16H 70/00 |

\* cited by examiner

AUTOMATED CONTENT GENERATION AND DELIVERY

TECHNICAL FIELD

This disclosure relates to systems and methods for automated content generation and delivery.

BACKGROUND

Content developers typically generate content with the goal of widespread consumer delivery. Content providers, such as television networks, social media platforms, online gaming platforms, and the like, recognize that widespread consumer exposure to content demonstrates that large consumer populations are attentive to the content being delivered. Content providers may then leverage the exposed content to deliver additional announcements or publications to the same large consumer populations. However, content is generally not personalized to any one consumer, and although some content may become popular with certain consumers, it will likely not be popular to everyone.

Some content developers, such as film production studios, are starting to offer interactive content with the goal of providing a generally more personal experience to the consumer, such as by enabling the consumer to define the storyline as they like. Still, in such cases, there are a limited number of options available for interaction such that the content is never truly personalized, and it becomes cost prohibitive to generate and introduce additional options. Other content developers, such as online multiplayer game development studios, offer opportunities for consumers to personalize character and other content, which requires considerable time and effort on the part of the consumer.

Such approaches to content generation and delivery require substantial resources on the part of the content developer and/or the consumer and, further, ultimately constrain the consumer to a limited number of predefined content options for personalization. Unconventional approaches to content generation and delivery, such as by automating the generation and delivery of highly personalized content to consumers using intelligence-driven computer-implemented systems, would thus be desirable.

SUMMARY

Disclosed herein are embodiments of systems and methods for automated content generation and delivery. The automated content generation and delivery may be used in an electronic device entertainment service context to synthesize stories based on requests received at the electronic device. The automated content generation and delivery may be used in a personal device entertainment service context to synthesize stories based on requests received at the personal device. The automated content generation and delivery may be used in a content device entertainment service context to synthesize stories based on requests received at the content device. The automated content generation and delivery may be used in an online entertainment service context to synthesize stories based on requests received from a remote device, such as an electronic device, a personal device, or a content device.

In an aspect, a method may include capturing an audible signal representing a request for story synthesis using one or more specified content items. The audible signal may be captured at an electronic device. The method may include transmitting the request for story synthesis and the one or more specified content items to a server device, such as from the electronic device. The method may include identifying a story template to use to process the request for story synthesis based on the one or more specified content items, such as at the server device. The method may include deploying crawlers to search one or more content sources for one or more other content items used by the story template, such as from the server device. The method may include retrieving the one or more other content items from the one or more content sources in response to the deployment of the crawlers, such as by the server device. The method may include synthesizing a story, such as at the server device. The story may be synthesized by combining at least some of the one or more specified content items and at least some of the one or more content items according to the story template. The method may include transmitting the synthesized story to the electronic device, such as from the server device. The method may include outputting the synthesized story, such as at the electronic device.

In an aspect, a method may include receiving a request for story synthesis using one or more specified content items. The request may be received from an electronic device. The method may include mapping the one or more specified content items to a story template. The method may include retrieving one or more other content items related to the one or more specified content items from one or more content sources. The one or more other content items may be retrieved based on the story template. The method may include synthesizing a story using the one or more specified content items and the one or more other content items. The method may include outputting the synthesized story for display at the electronic device.

In an aspect, a method may include capturing input using one or more input components. The method may include processing the input to identify a request for story synthesis and one or more specified content items associated with the request for story synthesis. The method may include transmitting a signal representative of the request for story synthesis and the one or more specified content items to a computing device. The method may include receiving a synthesized story in response to the transmitted signal, such as from the computing device. The synthesized story may represent a combination of at least some of the one or more specified content items and one or more other content items retrieved from one or more content sources. The one or more other content items are retrieved from the one or more content sources based on the signal transmitted to the computing device. The method may include outputting the synthesized story using one or more output components.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Automated content generation and delivery includes the synthesizing of stories for entertainment or other purposes. Story synthesis as used herein refers to the digital creation of sequenced information that tells a story based on a request. In particular, a request for story synthesis is processed by the automated computing system creatively retrieving or generating information, described herein in units of content items, and then arranging and assembling that information to present a story. In some cases, the story may be created to answer a question asked by a user of a computing device. In such a case, a request for story synthesis may thus begin with a user of a computing device asking a hypothetical question. Examples of questions which may be presented in connection with a request for story synthesis include, without limitation, "what would my life be like if I took the Senior Director job in Golden, Colo.," "what if I went to the University of Oregon instead of Oregon State University," and "what would my family life be like if we bought this house."

A system implementing the automated content generation and delivery responds to the question or other request for story synthesis by generating personalized content. Because the questions presented in connection with a request for story synthesis are personalized, the system personalizes the generation and delivery of the story. In particular, the system may use personalized information input in connection with a request for story synthesis to find other information, such as by retrieving such other information from a content source or by generating such other information. That is, some of the information which can be used to synthesize a story may already be included in the request for story synthesis. However, other information to use may not be. It is therefore important for the system to find or otherwise create such other information before the story is synthesized.

Identifying such other information to use to synthesize the story and generating or retrieving such other information presents a technical problem since the question presented in connection with a request for story synthesis does not include actual content depicting the information to be retrieved. A system which processes a request for story synthesis would therefore preferably be able to evaluate a request for story synthesis to understand the types of additional information needing to be retrieved and further be able to retrieve or otherwise generate it. The embodiments of this disclosure address problems such as these by synthesizing stories, including by retrieving or generating content items which are not included in the requests for the story synthesis, and arranging the retrieved or generated content items with the content items which are specified in connection with the request for story synthesis.

Figure 1:
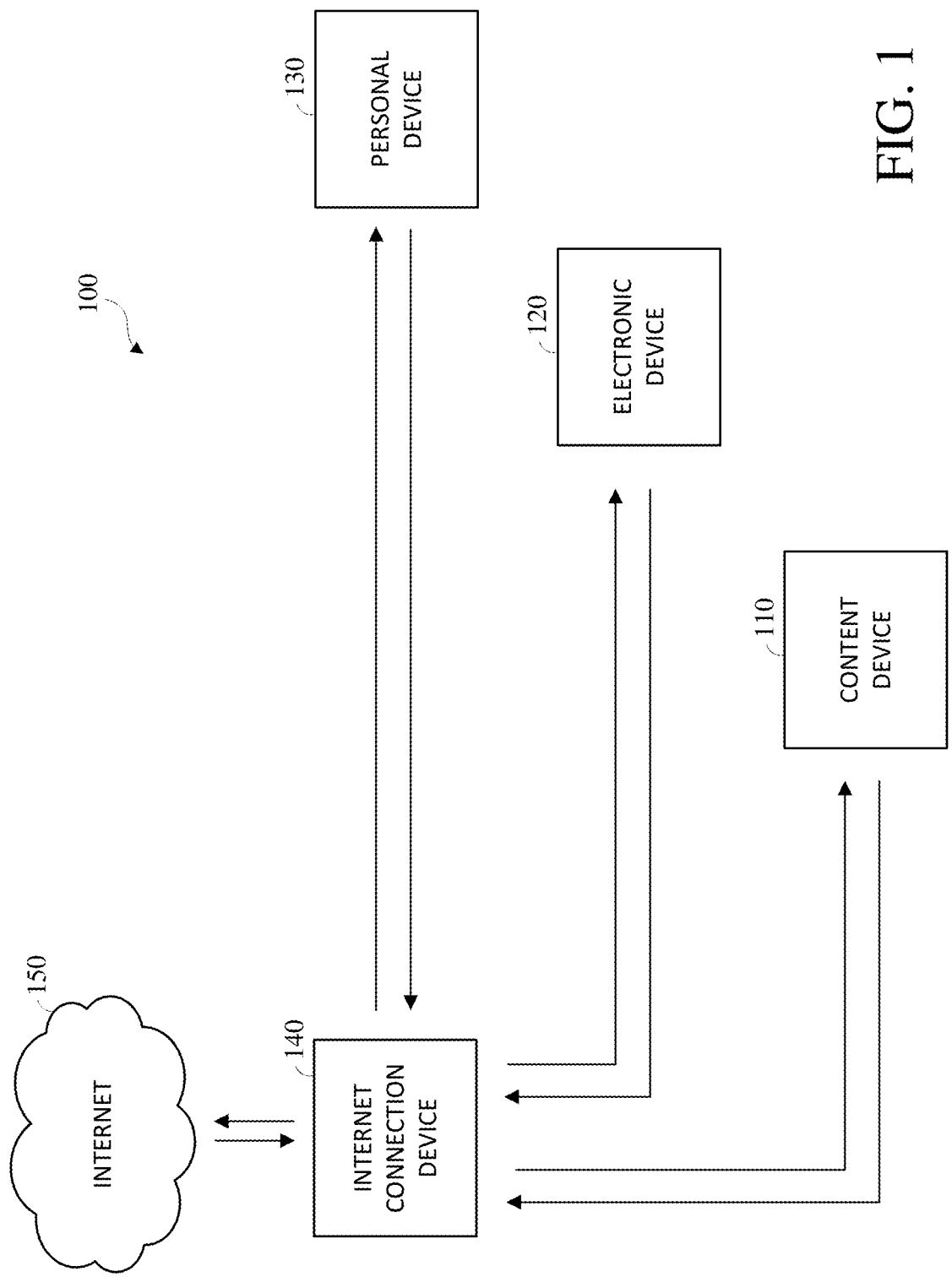
FIG. 1 is a block diagram of an example of a system for story synthesis in accordance with one or more embodiments of this disclosure.

FIG. 1 is a block diagram of an example of a system 100 for story synthesis. System 100 includes a content device 110, an electronic device 120, and a personal device 130. Although one electronic device 120 is shown in the system 100 by example, the system 100 may include more than one such electronic device. The electronic device 120 is configured to communicate with an internet connection device 140. The internet connection device 140 is configured to communicate with the content device 110, the electronic device 120, and personal device 130, such as over the Internet 150. In some embodiments, the internet connection device 140 may be further configured to communicate with one or more other devices not shown.

The content device 110 may be a device configured to interface with a user. The content device 110 is configured to output content, such as to the user. Examples of the content device 110 include, but are not limited to, a television (TV), a personal computer (PC), a tablet, a mobile phone, a gaming device, a satellite receiver, a terrestrial radio receiver, an audio receiver, a set-top-box (STB), a speaker, a camera, a personal wearable device, or an augmented reality/virtual reality (AR/VR) device. The content may include audio content, video content, or both. Audio content may include streaming audio, recorded audio, broadcast audio, point-to-point audio, or a combination thereof. Video content may include streaming video, recorded video, broadcast video, point-to-point video, or a combination thereof. The audio content, video content, or both, may be in real-time or pre-recorded. In some embodiments, the content device 110 may be interacted with using a remote control. The remote control may, for example, include one or more of a microphone, a keyboard, or other input components.

The electronic device 120 may be a device configured to interface with a user. The electronic device 120 may include multi-mode capabilities, and may include multiple transceivers for communicating with different wireless networks over different wireless links. For example, the electronic device 120 may be configured to communicate with a device that employs a Bluetooth® radio technology, and with a base station that employs an IEEE 802 radio technology. For example, the electronic device 120 may be a voice-activated electronic device (e.g., a smart speaker device with or without a display component), a personal hub used to connect multiple devices that use common communication protocols, a TV, a PC, a tablet, a mobile phone, a gaming device, a satellite receiver, a terrestrial radio receiver, an audio receiver, a STB, a speaker, a camera, a personal wearable device, an AR/VR device, or a device configured to interface with the user.

The personal device 130 may be a device configured to interface with a user. The personal device 130 may include multi-mode capabilities, and may include multiple transceivers for communicating with different wireless networks over different wireless links. For example, the personal device 130 may be configured to communicate with a base station that employs a cellular-based radio technology, and with the base station that employs an IEEE 802 radio technology. The personal device 130 may include, for example, a PC, a tablet, a mobile phone, a gaming device, a personal wearable device, an AR/VR device, or a device configured to interface with the user.

The internet connection device 140 may be a wireless router, Home Node B, Home eNode B, or access point, for example, and may utilize a suitable radio access technology for facilitating wireless connectivity in a localized area, such as a home, a place of business, an educational facility, a vehicle, and the like. The internet connection device 140 may communicate with the personal device 130 over an air interface, which may be a suitable wireless communication link, for example, radio frequency (RF), microwave, infrared (IR), ultraviolet (UV), visible light, and the like. The internet connection device 140 may implement a radio technology such as IEEE 802.11 to establish a wireless local area network (WLAN). The internet connection device 140 may implement a radio technology such as IEEE 802.15 to establish a wireless personal area network (WPAN). The internet connection device 140 may utilize a cellular-based radio access technology. Example cellular-based radio access technologies include wide-band code division multiple access (WCDMA), Global System for Mobile communications (GSM), Long Term Evolution (LTE), LTE-Advanced (LTE-A), and the like.

As shown in FIG. 1, the internet connection device 140 may have a direct connection to the Internet 150. Alternatively, the internet connection device 140 may access the Internet 150 via a core network (not shown). The Internet 150 may include a global system of interconnected computer networks and devices that use common communication protocols, such as the transmission control protocol (TCP), user datagram protocol (UDP) and the internet protocol (IP) in the TCP/IP internet protocol suite.

Figure 2:
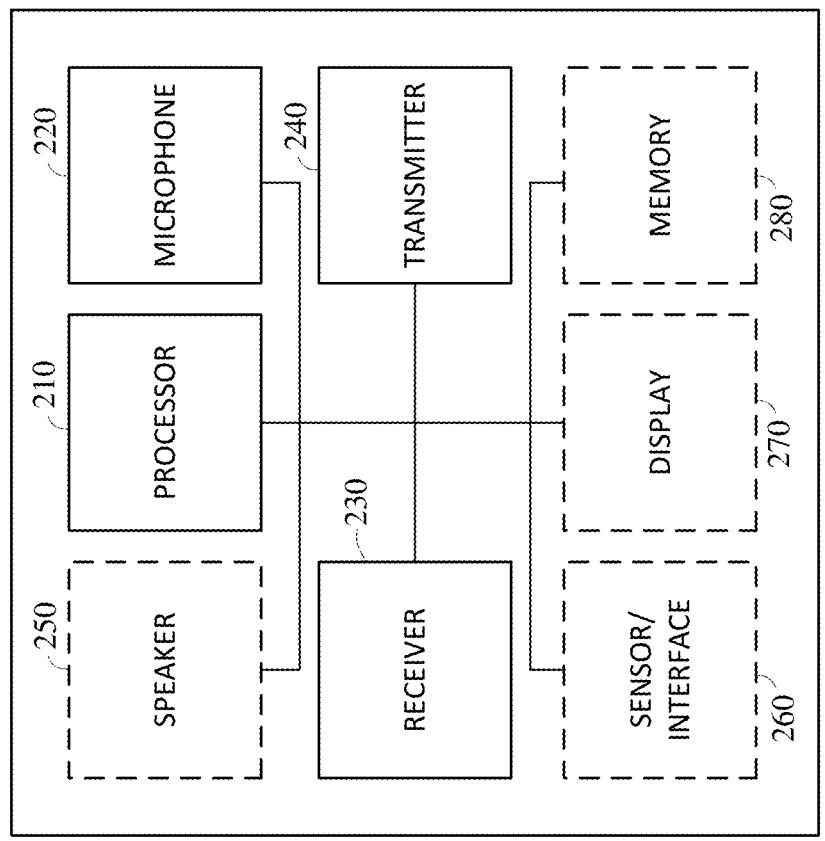
FIG. 2 is a block diagram of an example of an electronic device capable of receiving inputs in accordance with one or more embodiments of this disclosure.

FIG. 2 is a block diagram of an example of an electronic device 200 capable of receiving inputs. Example embodiments of the electronic device 200 may include, but are not limited to, the content device 110, the electronic device 120, and the personal device 130 shown in FIG. 1. The electronic device 200 includes a processor 210, a microphone 220, a receiver 230, and a transmitter 240. In some embodiments, the receiver 230 and transmitter 240 may be combined into a single transceiver unit. In some embodiments, the electronic device 200 may further include a speaker 250, a sensor/interface 260, a display 270, a memory 280, or a combination thereof.

The processor 210 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, another type of integrated circuit (IC), a state machine, and the like. The processor 210 may perform signal coding, data processing, power control, input/output processing, and/or another functionality that enables the electronic device 200 to operate.

The processor 210 may be coupled to the receiver 230 and the transmitter 240. While FIG. 2 depicts the processor 210, the receiver 230, and the transmitter 240 as separate components, it will be appreciated that the processor 210, the receiver 230, and the transmitter 240 may be integrated together in an electronic package or chip. For example, the processor 210 may be configured to receive a request for story synthesis using one or more specified content items, map the one or more specified content items to a story template, retrieve one or more other content items related to the one or more specified content items from one or more content sources based on the story template, synthesize a story using the one or more specified content items and the one or more other content items, and output the synthesized story to a computing device. In another example, the processor 210 may be configured to capture an audible signal using one or more microphones, process the audible signal to identify a request for story synthesis and one or more specified content items associated with the request for story synthesis, cause a transmission of a signal representative of the request for story synthesis and the one or more specified content items to a computing device, receive a synthesized story in response to the transmitted signal, and output the synthesized story using one or more output components.

The microphone 220 is coupled to the processor 210 and may be configured to receive audible and inaudible inputs. The microphone 220 may include multiple microphones to extend the coverage area of audio capture. An audible input may include an audible signal at frequencies perceptible to a human ear from about 20 Hz to about 20,000 Hz. An inaudible input may include inaudible signals at frequencies that are not perceptible to the human ear from below 20 Hz and above 20,000 Hz. The microphone 220 may be configured to detect an auditory command, for example, a user voice, as an input. In some embodiments, the microphone 220 may be configured to detect a voiceprint in a voice response. For example, the voiceprint may identify a user based on a unique pitch, intonation, inflection, or a combination thereof. The microphone 220 may be configured to distinguish between active and passive users based on signal triangulation of the voice response, distance of the voice response, signal strength of the voice response, or a combination thereof.

The receiver 230 may be configured to receive signals from an internet connection device, for example, the internet connection device 140 shown in FIG. 1. In some embodiments, the receiver 230 may be an antenna configured to receive inaudible inputs such as RF signals. In some embodiments, the receiver 230 may be a detector configured to receive inaudible inputs such as IR, UV, or visible light signals. In some embodiments, the receiver 230 may be configured to receive both RF and light signals. The receiver 230 may be configured to receive other combinations of wireless signals.

The transmitter 240 may be configured to transmit signals to an internet connection device, for example, the internet connection device 140. In some embodiments, the transmitter 240 may be an antenna configured to transmit RF signals. In some embodiments, the transmitter 240 may be an emitter configured to transmit IR, UV, or visible light signals. In some embodiments, the transmitter 240 may be configured to transmit both RF and light signals. The transmitter 240 may be configured to transmit other combinations of wireless signals. The transmitter 240 may be configured to transmit information to other electronic devices to eliminate duplicate records or responses.

The speaker 250 may be coupled to the processor 210 and may be configured to emit audible signals. In some embodiments, the speaker 250 may be configured to emit inaudible signals, such as in addition to or instead of audible signals. The audible and/or inaudible signal may be representative of data processed by or otherwise using the processor 210, for example, a story synthesized based on a request therefor. The speaker 250 may include multiple speakers to extend the sound field.

The sensor/interface 260 may be coupled to the processor 210 and may include one or more software and/or hardware modules that provide additional features, functionality and/ or wired or wireless connectivity. For example, the sensor/ interface 260 may include an accelerometer, an e-compass, a satellite transceiver, an image sensor (for photographs or video), a universal serial bus (USB) port, a vibration device, a television transceiver, a hands free headset, a Bluetooth® module, a frequency modulated (FM) radio unit, a digital music player, a media player, a video game player module, a keyboard, an Internet browser, and the like. The sensor/interface 260 may be configured to detect motion-based or gesture-based commands. The sensor/interface 260 may be configured to perform facial recognition. For example, facial recognition may be used to correlate a response to a specific user and to determine which responses to ignore. For example, if a user is not recognized via facial recognition, a response from that user may be ignored.

The display 270 may be coupled to the processor 210 and may be a liquid crystal display (LCD) display unit, a light emitting diode (LED) display unit, or an organic light-emitting diode (OLED) display unit. The display 270 may be configured to receive input. For example, the display 270 may be a capacitive touch display in some embodiments. The display 270 may be configured to output data processed by or otherwise using the processor 210, for example, a story synthesized based on a request therefor. In some embodiments, the data output as a story synthesized based on a request may be simultaneously output using the speaker 250 and the display 270. For example, the processor 210 can synchronize the outputting of an audio component of the story synthesized based on the request using the speaker 250 and a video component of the story synthesized based on the request using the display 270.

The memory 280 may be coupled to the processor 210. The memory 280 may include volatile memory, persistent storage, or both. Volatile memory may include random access memory (RAM), dynamic random access memory (DRAM), static random access memory (SRAM), and the like. Persistent storage may include read-only memory (ROM), a hard disk, or another type of memory storage device. Persistent storage may include a removable storage element such as a memory stick, a secure digital (SD) memory card, and the like. The memory may be configured to store a usage profile of a user, a voiceprint of the user, a walk gait of the user, a gesture gait of the user, a sign gait of the user, other information about the user, or a combination thereof.

Figure 3:
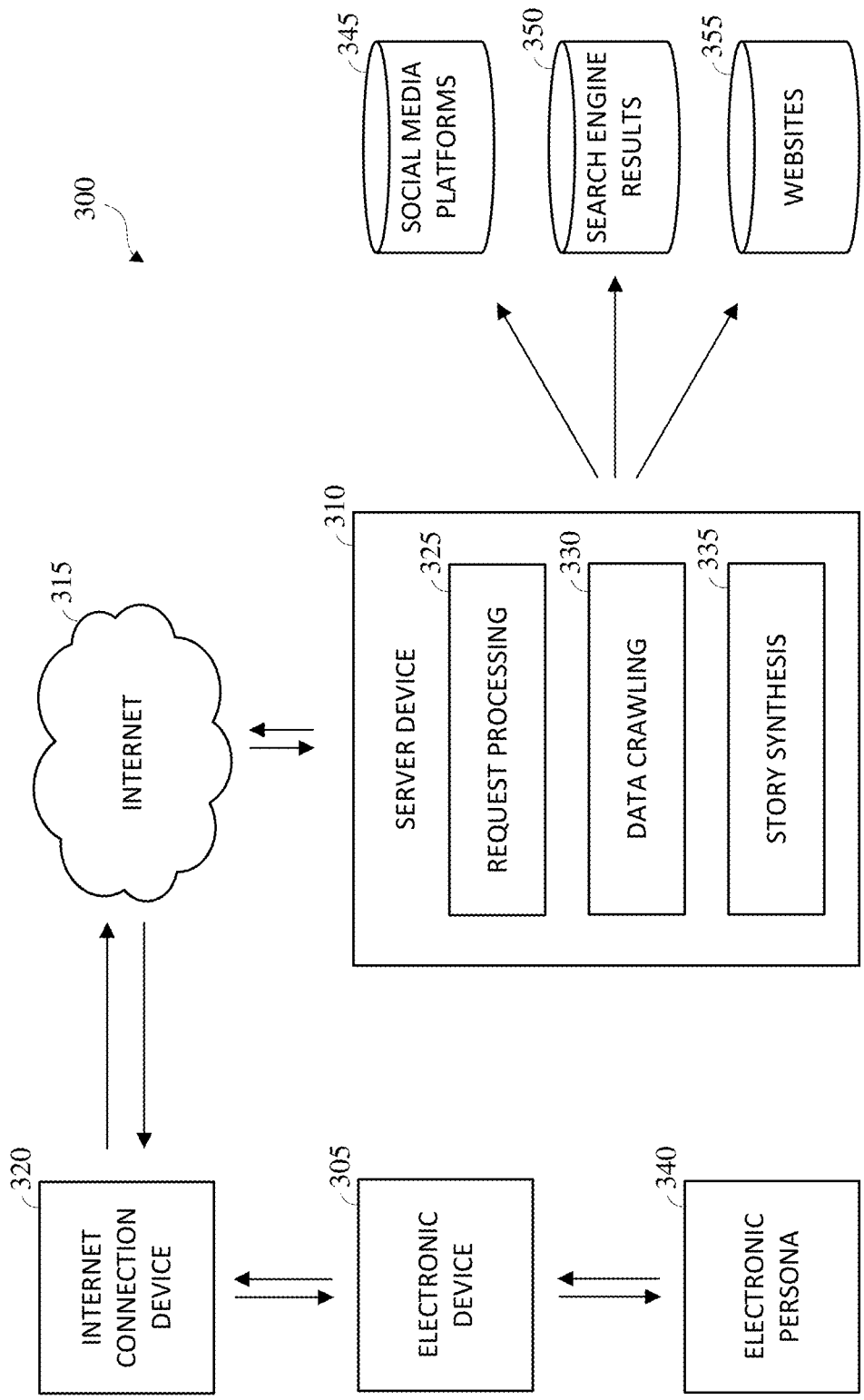
FIG. 3 is a functional block diagram of an example of a system including an electronic device in accordance with one or more embodiments of this disclosure.

FIG. 3 is a functional block diagram of an example of a system 300 including an electronic device 305. The electronic device 305 communicates with a server device 310 over the Internet 315 using an Internet connection device 320. In some embodiments, the system 300 may, for example, be the system 100 shown in FIG. 1. In such an embodiment, the electronic device 305, the Internet 315, and the Internet connection device 320 may respectively be the electronic device 120, the Internet 150, and the Internet connection device 140 shown in FIG. 1.

The server device 310 is a computing device which processes information, instructions, commands, signals, or other communications received from the electronic device 305. In particular, the server device 310 includes functionality recognized in hardware, software, or a combination thereof for synthesizing a story for output at the electronic device 305 based on a request received from the electronic device 305. The functionality of the server device 310 used for story synthesis includes a request processing module 325, a data crawling module 330, and a story synthesis module 335. In some embodiments, the server device 310 may refer to a software server rather than a hardware server. For example, in such an embodiment, the server device 310 may be implemented using a Java Virtual Machine, a web server, or other software for hosting applications and data.

Prior to the performance of operations at the server device 310, a request is transmitted from the electronic device 305. The request is generated at the electronic device 305 based on input received at the electronic device 305. The input may include information received at the electronic device 305. For example, where the electronic device 305 is a smart speaker device, the input information may include speech received at the smart speaker device. The speech may, for example, be audible language spoken by a user of the electronic device 305 which is captured using a microphone of the electronic device 305. In another example, the input information may be included in a signal transmitted from a computing device in communication with the electronic device 305. For example, a personal device (e.g., the personal device 130 shown in FIG. 1) may connect to the electronic device 305 using a wired (e.g., USB) or wireless (e.g., Bluetooth®) and transmit the input information in a signal over that connection.

Alternatively, the input may include information generated or selected at the electronic device 305. For example, the input information may be generated based on input received directly at the electronic device 305 (e.g., using a touch screen or other interface thereof). For example, some or all parts of the request may be received as input from a user of the electronic device 305, such as by using a display of the electronic device 305 to enter the question presented as text or other non-verbal input (e.g., through a touch screen interface). In another example, the input information may be selected from a list of available options output for user review by the electronic device 305. For example, the user of the electronic device 305 may be presented with the list of options via a display of the electronic device 305 or an enumeration of options presented by audio via a speaker of the electronic device 305.

In either such case, the input may, in some embodiments, be associated with an electronic persona 340. The electronic persona 340 represents a collection of information, which may, for example, be presented in the form of a profile or other record. For example, the electronic persona 340 may indicate questions presented by the user in connection with requests for story synthesis, a number of times the user has caused requests for story synthesis to be transmitted to the server device 310, information about each device (e.g., including the electronic device 305) which the user uses, specified content items included in requests for story synthesis from the user, other content items retrieved based on the requests for story synthesis from the user, story templates used for processing the requests for story synthesis from the user, and/or other information.

In some embodiments, the information represented by the electronic persona 340 may guide the processing of the request for story synthesis at one or more of the request processing module 325, the data crawling module 330, or the story synthesis module 335. For example, the information represented by the electronic persona 340 may include information associated with a person's name, location, education level, educational institution name, career industry, employer name, familiar status, or the like. Such information may be processed in connection with a request for story synthesis, including by using such information to identify specified content items, a story template, and/or other content items. For example, information represented by the electronic persona 340 can be associated with story metrics, as will be described below. In another example, information represented by the electronic persona 340 can be used to fill in gaps within a request for story synthesis. For example, the question "Where should I move to in my city?" does not include information indicating the current location of the user who asked the question. The electronic persona 340 of that user may thus be consulted to identify a location.

The functionality for maintaining the electronic persona 340 may include functionality for creating profiles or other records, functionality for updating profiles or other records, or both. The electronic persona 340 may be retrieved, selected, or otherwise identified based on input received at the electronic device 305. For example, the input can be processed to select, retrieve, or otherwise identify the electronic persona 340. In some embodiments, the processing of the input to identify the electronic persona 340 can be performed as a pre-processing operation at the electronic device 305. In some embodiments, the electronic device 305 may request information from one or more other sources (e.g., a database at the server device 310) to select, retrieve, or otherwise identify the electronic persona 340.

The request is a request for story synthesis. As used herein, story synthesis generally refers to the creation of narrative content by combining content items. The request received at the server device 310 from the electronic device 305 includes specified content items and asks for a story, such as by framing a "what if" question based on the specified content items. The specified content items are initial seeds of information which serves as the foundation for the story synthesis. The request processing module 325 processes the request received from the electronic device 305 to identify the specified content items which were included in the request. In some embodiments, the request processing module 325 can include functionality for performing the following operations: receiving the request transmitted from the electronic device 305, processing the request to identify one or more specified content items included in the request, using the one or more specified content items to identify a story template to use for story synthesis, and using the story template to identify one or more other content items to use to synthesize the story.

Processing the request to identify one or more specified content items included in the request can include using natural language processing. The natural language processing can be performed to identify the specific question presented in the request along with the specified content items, such as to provide context for the specified content items. Performing natural language processing to identify the one or more specified content items can include using one or more natural language processing techniques against the input received by the request processing module 325. In particular, the natural language processing may be performed based on syntactic, semantic, morphologic, and/or pragmatic processing of some or all words included in a request for story synthesis.

Performing the natural language processing against the request for story synthesis can include pre-processing the request for story synthesis to isolate specific words therefrom. For example, the pre-processing can include: tokenizing words by converting text strings into vector or other formats; and/or parsing and tagging words with grammatical, meaning, tense, and contextual tags. The pre-processed words may then be modeled, such as by feature extraction and/or speech modeling, to determine the conversational usage thereof. Output representing the natural language processed request can then be processed based on the modeled words, such as by using sentiment classification, entity extraction, translation, and/or topic modeling.

However, alternative approaches for performing the natural language processing may instead be used. In some embodiments, text embeddings may be used. For example, real valued vector representations of the text strings from which the words of the request for story synthesis are converted may be used to construct vectors for each word according to similar vectors, such as based on contextual likeness of the words. Each word in a vocabulary may correspond to a constructed vector. The text embeddings can include calculating probabilities of word context similarities based on the position of information within a set of vectors. For example, the probability of a certain context being accurate may be determined with respect to a center term within a vector.

In some embodiments, a trained deep learning system may be used to perform natural language processing. For example, the trained deep learning system may use one or more learning approaches, which may, for example, include, but are not limited to, word vector representations, window-based neural networks, recurrent neural networks, long-short-term-memory models, recursive neural networks, or convolutional neural networks. The trained deep learning system may include, use, or otherwise access a library or other store of comprehended words which can then be mapped against words included in a request for story synthesis. The trained deep learning system may use and/or identify patterns in mapped speech.

In some embodiments, semantic tagging and/or searching may be used to perform natural language processing. For example, semantic tagging can include evaluating each word included in the request to determine a part of speech therefor. Words which are determined to be nouns, verbs, adjectives, and adverbs may later be identified as specified content items, whereas words which are determined to be prepositions, conjunctions, and interjections may not later be identified as specified content items. In another example, semantic searching can include intelligent keyword searching, such as by identifying words of substance within the request. Words without substance may, for example, include "a," "the," "of," or the like.

In some embodiments, the request processing module 325 can identify the specified content items included within the "what if" question framed as the request by comparing the natural language processed words of the request to story metrics. The story metrics represent categories of content which may be included in the request and, therefore, categories of content which are relevant to the story synthesis. Examples of story metrics include, without limitation, community, location/geography, career, education, recreation, place, arts, demographics, family, and public transportation.

Determining that a word included in the request is a specified content item includes comparing the word to the story metrics. The request processing module 325 may use a library of known words to match words in the request with story metrics. For example, the library may indicate that the words "work" and "job" correspond to the "career" story metric, whereas the words "Colorado" and "Oregon" correspond to the "places" story metric. The request processing module 325 can determine that each of the specified content items may correspond to one or more story metrics. In some embodiments, if the request processing module 325 is unable to match a word included in the request to a story metric, the request processing module 325 may transmit a signal to the electronic device 305 to cause the electronic device 305 to prompt the user thereof for further input specifying a story metric for that unmatched word.

The request processing module 325 further processes the request by identifying a story template to use to process the request for story synthesis based on the one or more specified content items. The story template is a sequence, model, or guide for synthesizing a story. The story template includes a number of content spaces. Some of the content spaces will be filled by the specified content items. The remaining content spaces will be filled in by other content items not included in the request. Mapping the specified content items to the story template can include mapping the specified content items to a story template, selecting the story template such as from a set of candidate story templates, or the like.

There may be multiple candidate story templates available for processing the request for story synthesis. As such, identifying the story template can include selecting one of the candidate story templates. Identifying the particular story template to use to process the request for story synthesis first includes using story metrics which correspond to the specified content items included in the request. For example, where the story metrics were determined during the natural language processing of the request, the same story metrics may be used to identify the story template. In another example, where the specified content items were identified without using the story metrics, the specified content items are now compared to the story metrics.

A story template may be selected based on the "what if" question framed as the request received from the user of the electronic device 305. Different types of "what if" questions may result in different stories based on the input information supplied and the output information to be produced as a result. For example, the question "what would my life be like if I took the job in Denver" may result in a synthesized story which describes career points and lifestyles similar to that of the user of the electronic device 305, but relocated to the city of Denver, Colo. However, the question "where would I be now if I married my ex" may result in a synthesized story which describes family life based on information about the user of the electronic device 305 and his or her former romantic partner.

Selecting a story template includes determining which metrics correspond to the specified content items. For example, in the question "What would my life be like if I took the Senior Director job in Golden, Colo.," the specified content items are senior director job, which corresponds to the career metric, and Golden, Colo., which corresponds to the location/geography metric. In another example, in the question "What if I went to the University of Oregon instead of Oregon State University," the only specified content item is the University of Oregon, which corresponds to the place metric.

To select a story template based on the specified content items of the request for story synthesis, a determination is made as to the story metrics to which the specified content items correspond. The story metrics which correspond to the specified content items are then ranked based on the question presented by the request for story synthesis. The rankings may be defined based on a perceived subject of the question and degrees of relationship to the perceived subject. For example, in the question "What would my life be like if I took the Senior Director job in Golden, Colo.," the phrase Senior Director job may be the subject and the location/geography of Golden, Colo. may be a related phrase. As such, the career metric may be ranked higher than the location/geography metric. Alternatively, the rankings may be defined based on empirical data, such as over time by processing requests for story synthesis.

Each candidate story metric of the set of candidate story metrics may correspond to a different set of story metrics and/or to a different ranking of story metrics. Thus, a story template can be selected from the set of candidate story templates based on the story metrics which correspond to the specified content items and/or to the ranking thereof. The server device 310 may maintain a list of which story templates are best based on which metrics are implicated. In some cases, metrics may be ranked based on a perceived importance, which ranking may also impact the selection of a story template. Each story template seeks to fill in at least one other metric not already corresponding to a specified content item with one or more other content items. In some embodiments, if multiple story templates are available and equally viable (within reason), a follow-up question may be presented to the user of the electronic device 305 to determine which of the multiple story templates should be selected.

In some embodiments, the electronic device 305 does not process the request other than by gathering the input information thereof and transmitting the request to the server device 310. However, in some embodiments, aspects of the request processing may be performed at the electronic device 305, such as before the request is transmitted to the server device 310. For example, in some embodiments in which the electronic device 305 is a smart speaker device and the input information of the request is captured using a microphone of the electronic device 305, the electronic device 305 can process the input information (e.g., using natural language processing) to indicate or otherwise signal the specified content items to the server device 310. In some such embodiments, the electronic device 305 can identify the specified content items from within an audible signal captured at the electronic device 305 and then produce a request for story synthesis. The produced request for story synthesis may, for example, be a command, instructions, or another signal used to indicate (e.g., to the server device 310) that a story is to be synthesized using particular specified content items.

Once the story template is selected, the other content items to include in the story are identified and retrieved. First, a determination is made as to the particular types of other content items to be retrieved based on the story template and the specified content items. The content spaces to be used for the other content items within the story template may each correspond to one or more story metrics. Based on those story metrics, the types of other content items can be identified. Other content items of such types may then be searched for and retrieved, such as from one or more content sources. For example, a story template may include first, second, and third content spaces. The first and third spaces may be used by specified content items. The second space is not, and corresponds to the "arts" story metric. The other content item which may be retrieved and used in the second space of the story template may thus be a content item which relates to the question presented in connection with the request for story synthesis and which further relates in some way to arts.

The data crawling module 330 is used to retrieve or generate the other content items. In some embodiments, the data crawling module 330 can include functionality for performing the following operations: receiving an indication of the other content items to retrieve or generate, selecting one or more crawlers to deploy to one or more content sources to retrieve the other content items, deploying the crawlers to retrieve the other content items, and receiving the content in response to the deployment of the crawlers or generating the other content items in response to the crawlers not locating the other content items.

In particular, the data crawling module 330 may deploy crawlers to search through the content sources for the other content items, such as to retrieve the other content items from those content sources. The content sources may include social media platforms 345 (e.g., Facebook®, Twitter®, Instagram®, Snapchat®, LinkedIn®, GlassDoor®, or the like), search engine results 350 (e.g., from Google®, Bing®, or the like), and/or websites 355 (e.g., blogs, Census Bureau pages, astrology pages, numerology pages, municipal pages, company pages, school pages, recreational activity pages, or the like). However, other examples of the content sources are possible. For example, a content source searched by the data crawling module 330 may be or include a local storage (e.g., of a personal device), a photo gallery, or another data store. The content sources are generally sources at which data may be stored and from which data may be partially or wholly retrieved in some form.

A crawler deployed by the data crawling module 330 are internet bots configured to search through a content source. The crawler may be configured for data scraping of one or more content sources. For example, the crawler may be configured to search for content on the Internet, download some or all of a webpage, and extract some or all information from the downloaded webpage. The crawler may be configured to report when data matching or similar to one of the other content items to be retrieved has been identified within a content source. For example, the crawler may signal, to the data crawling module 330 an identification of other content items in response to identifying such other content items. A crawler deployed by the data crawling module 330 may use one or more techniques for crawling, including, without limitation, text pattern matching, HTTP programming, HTML parsing, DOM parsing, vertical aggregation, semantic annotation recognition, screen scraping, or computer vision analysis.

The particular manner in which a crawler searches through a content source may depend or otherwise vary based on the content source, based on the other content items to retrieve, or both. For example, a crawler searching through one of the social media platforms 345 may begin searching a social media account of the user of the electronic device 305. In some embodiments, the user of the electronic device 305 may have already granted permissions for the crawler to access some or all of his or her social media account. In some embodiments, the crawler may search through the social media account of the user of the electronic device 305 without permissions first being granted. In such a case, the crawlers may or may not have limited access. The crawler may then search through the social media account page of the user of the electronic device 305 to identify other pages through which to search for other content items. For example, where the user of the electronic device 305 asks for a story to be synthesized based on the question "what would life be like for my spouse and I if we became social activists in Washington, D.C.," a crawler may search through the social media account page of the user of the electronic device 305 to identify the social media account page of his or her spouse. The crawler may then proceed to search through the social media account of the spouse, such as for photographs or other information which may be used to identify one or more of the other content items.

In another example, the crawler searching through one of the social media platforms 345 may begin searching at a page other than of the social media account of the user of the electronic device 305. For example, where the user of the electronic device 305 asks for a story to be synthesized based on the question "what would my career be like had I accepted a job at XYZ Corp.," a crawler may search for a social media page of XYZ Corp. within the social media platform 345. Upon finding the page, the crawler may search the social media account page of XYZ Corp. to identify photographs, text, and other information which may be useful to describe what working at XYZ Corp. is like. The crawler may then search connected social media account pages of social media platform users who have linked themselves to XYZ Corp., such as by indicating that they are a current employee of XYZ Corp. The crawler may use information from social media account pages of such employees to identify discussion of work life at XYZ Corp., to identify pictures of the employees at work or outside of work, or the like.

In another example, a crawler searching through search engine results 350 may be configured to initiate a search engine inquiry and crawl through results. For example, the crawler may be deployed along with some or all of the question presented by the user of the electronic device 305. The crawler may simply input the question in natural language form within a search engine prompt and automate a searching based on that query. The crawler may then search through some or all of the search results for the other content items.

In another example, a crawler searching through websites 355 may be configured to search the headers and/or bodies of the websites 355 for other content items. For example, a crawler may be configured to search the bodies of websites 355 using keyword searching or other search techniques for locating other content items within the websites 355. In another example, a crawler may be configured to search through website headers, such as HTML or other code, for information related to one or more of the other content items.

In some embodiments, the server device 310 may maintain a database (not shown) for storing content items retrieved using crawlers deployed by the data crawling module 330 and for storing other information. For example, other content items which have been retrieved for processing one request for story synthesis may later be used to process another request for story synthesis, such as from the same user of the electronic device 305, a different user of the electronic device 305, or a user of a different electronic device. Prior to deploying crawlers to retrieve other content items, the server device 310 may include functionality for searching its database for other content items. In the event such other content items are found in the database of the server device 310, the data crawling module 330 may not deploy crawlers to retrieve those other content items. In the event only some other content items are found in the database of the server device 310, the data crawling module 330 may deploy crawlers to retrieve the remaining other content items.

The story synthesis module 335 is used to synthesize the story associated with the request for story synthesis using the specified content items included in the request and the other content items retrieved or generated based on the request. In some embodiments, the story synthesis module 335 can include functionality for performing the following operations: receiving the specified content items, the other content items, and the story template; determining an order for arranging the specified content items and the other content items according to the story template; and synthesizing a story by combining at least some of the specified content items and at least some of the other content items according to the order.

Once the other content items are retrieved, the story synthesis module 335 combines the other content items with the specified content items received at the server device 310 to synthesize a story. Combining the specified content items with the other content items may include determining a sequence for arranging those content items and then temporally arranging them according to that sequence. The sequence may, for example, be indicated by the story template. For example, the order of the content spaces of the story template and the types of content items which are used by each such content space can control the order in which the content items are arranged in the synthesized story.

In some embodiments, synthesizing the story may include adding additional media content or elements to the story. For example, where the story template is used to combine text and images to form a slideshow presentation, an additional music layer may be created for the slideshow presentation such as by the story synthesis module 335 adding music tracks thereto. In some such embodiments, the music tracks may be selected by the story synthesis module 335. In other such embodiments, the music tracks may be selected by the user of the electronic device 305.

One the story synthesis module 335 has completed the synthesizing of the story, the story is output to the electronic device 305. The synthesized story may then be output at the electronic device 305 for the user thereof, such as via a speaker or display of the electronic device 305. In some embodiments, however, the story may be synthesized at the electronic device 305. For example, the server device 310 may transmit instructions for synthesizing the story and the content items to be synthesized to the electronic device 305. The instructions for synthesizing the story can include or otherwise indicate a framework for the story, such as based on a sequence of content to display according to the story template.

In some embodiments, the server device 310 may include machine learning functionality. For example, the machine learning functionality may be used to identify specified content items within a request for story synthesis. In another example, the machine learning functionality may be used to search for, retrieve, and/or generate other content items. In yet another example, the machine learning functionality may be used to select a story template and/or combine content items according to a selected story template. The machine learning functionality of the server device 310 may include functionality for training and/or for performing inference using a machine learning model. Embodiments and examples of system intelligence training and inference are discussed below with respect to FIG. 6.

Figure 4:
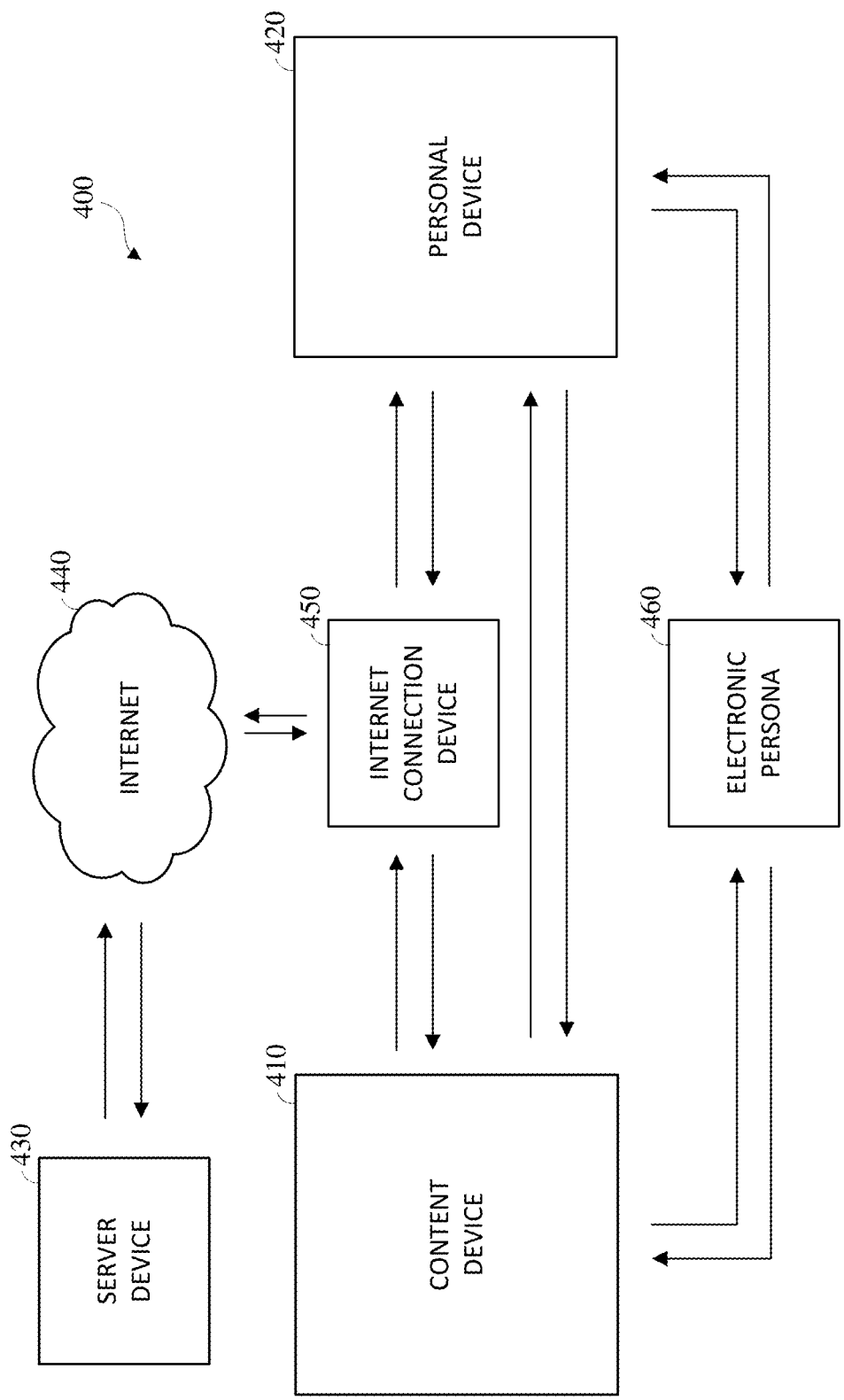
FIG. 4 is a functional block diagram of an example of a system including a content device and a personal device in accordance with one or more embodiments of this disclosure.

FIG. 4 is a functional block diagram of an example of a system 400 including a content device 410 and a personal device 420. Either or both of the content device 410 or the personal device 420 may communicate with a server device 430 over the Internet 440 using an Internet connection device 450. In some embodiments, the system 400 may, for example, be the system 100 shown in FIG. 1. In such an embodiment, the server device 430, the Internet 440, and the Internet connection device 450 may respectively be the server device 310, the Internet 315, and the Internet connection device 320 shown in FIG. 3. Thus, the server device 430 may include a request processing module, a data crawling module, and a story synthesis module, which may, for example, respectively be the request processing module 325, the data crawling module 330, and the story synthesis module 335 shown in FIG. 3.

The system 400 demonstrates alternatives to the system 300 in which a request for story synthesis is received at the server device 430 from a device other than an electronic device (e.g., the electronic device 305 shown in FIG. 3). For example, as shown in FIG. 4, a request for story synthesis may instead be received based on input captured at the content device 410 or the personal device 420. In another example, a request for story synthesis may be received based on input captured wholly or partially both the content device 410 and the personal device 420. In each such case, the processing of the request for story synthesis at the server device 430 may follow the same or substantially similar operations as are described above with respect to the server device 310 of FIG. 3. The input captured at the content device 410, the personal device 420, or both may be associated with an electronic persona 460, which may, for example, be the electronic persona 340 shown in FIG. 3 or another electronic persona.

In some embodiments, the content device 410 is used to transmit the request for story synthesis to the server device 430. For example, the content device 410 may be a STB connected to a television or monitor. In another example, the content device 410 may be a smart television. The content device 410 can capture the "what if" question from the user of the content device 410 using a device associated with the content device 410. For example, the device associated with the content device 410 may be a remote used to control the content device 410 and/or the television or monitor connected thereto. The remote may include functionality for receiving input via a microphone or user interface elements (e.g., buttons or keys) built into the remote. In some embodiments, the content device 410 may include a microphone for capturing the input. The content device 410 may include native functionality for capturing the input and transmitting the request for story synthesis to the server device 430. Alternatively, a user of the content device 410 may install application software onto the content device 410 to enable the content device 410 to do so. The content device 410 can transmit the request for story synthesis to the server device 430 over the Internet 440 using the Internet connection device 450. Alternatively, the content device 410 can use a separate connection (e.g., a fiber or like cable not connected to the Internet connection device 450) to transmit the request for story synthesis to the server device 430.

In some embodiments, the personal device 420 is used to transmit the request for story synthesis to the server device 430. For example, the personal device 420 may be a smart phone, laptop, or other personal computing device. The personal device 420 can capture the "what if" question from the user thereof via a microphone or user interface elements (e.g., buttons or keys) of the personal device 420. The personal device 420 may include native functionality for capturing the input and transmitting the request for story synthesis to the server device 430. Alternatively, a user of the personal device 420 may install application software onto the personal device 420 to enable the personal device 420 to do so. The personal device 420 can transmit the request for story synthesis to the server device 430 over the Internet 440 using the Internet connection device 450.

In some embodiments, both the content device 410 and the personal device 420 may be used in connection with a request for story synthesis. For example, the request for story synthesis may be initiated based on input captured at the personal device 420. The personal device 420 may then transmit the input to the content device 410, such as using a short range transmission protocol (e.g., Bluetooth®). The content device 410 may then transmit the request for story synthesis to the server device 430 and later receive the synthesized story from the server device 430. The content device 410 may cause the synthesized story to be output for display or otherwise output at the personal device 420. For example, the content device 410 can use the same previously established connection (e.g., Bluetooth®) to transmit the synthesized story to the personal device 420. In some embodiments, the input may be captured at the content device 410 and transmitted to the personal device 420. The personal device 420 may then transmit the request for story synthesis to the server device 430 and later receive the synthesized story from the server device 430. The personal device 420 may cause the synthesized story to be output for display or otherwise output at the content device 410 or at a device connected thereto.

Figure 5:
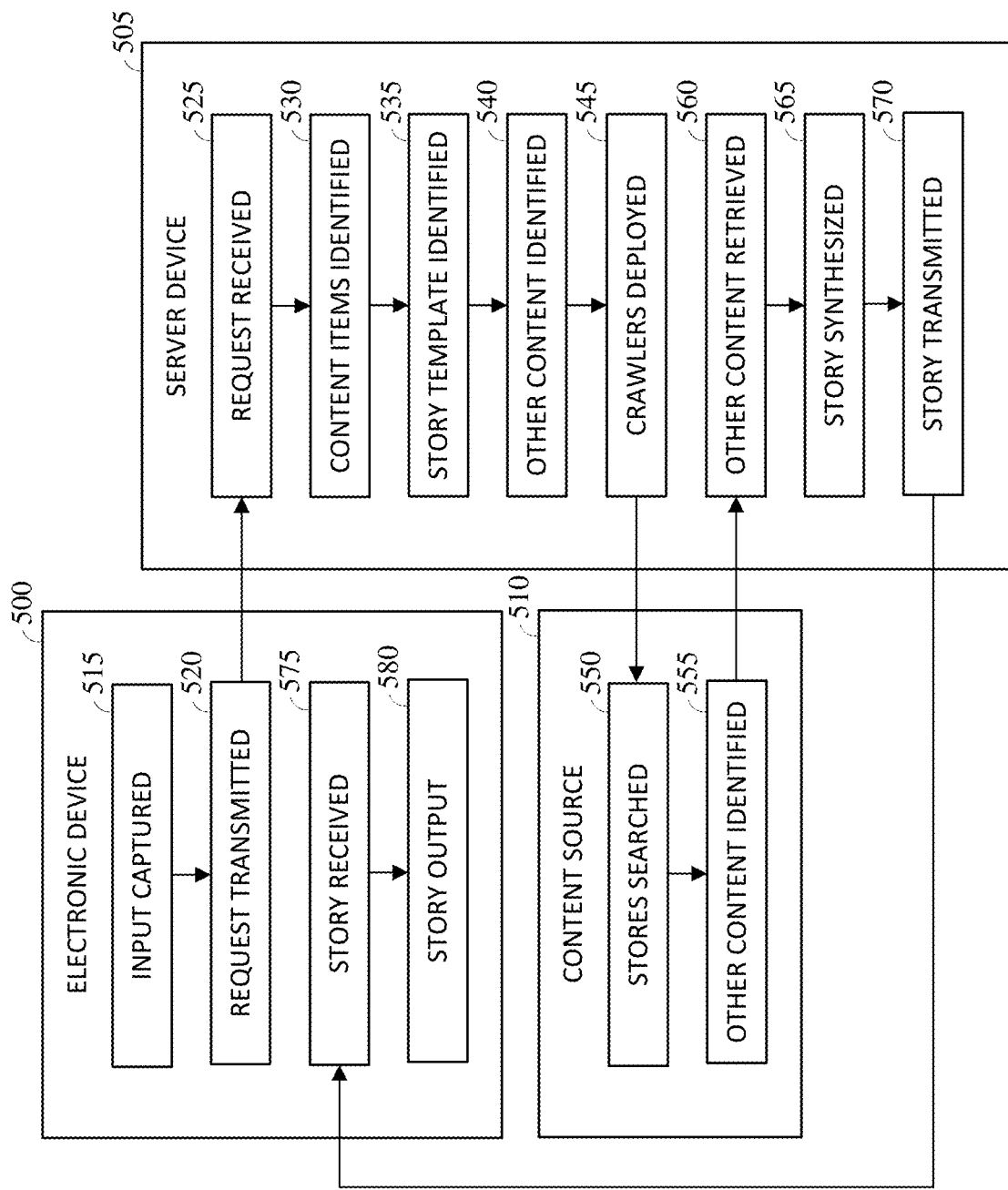
FIG. 5 is a functional block diagram of an example of a request processing pipeline in accordance with one or more embodiments of this disclosure.

FIG. 5 is a functional block diagram of an example of a request processing pipeline. The pipeline includes operations performed at an electronic device 500, a server device 505, and a content source 510. The pipeline begins at 515 with the capturing of input at the electronic device 500. At 520, a request for story synthesis is transmitted from the electronic device 500. At 525, the request for story synthesis is received at the server device 505. In some embodiments, the request for story synthesis is processed using natural language processing at the server device 505 after being received from the electronic device 500. In some embodiments, the request for story synthesis is processed using natural language processing at the electronic device 500 before being transmitted to the server device 505.

At 530, specified content items are identified at the server device 505. At 535, a story template is identified, selected, or determined at the server device 505 based on the specified content items. Specifically, the story template is identified, selected, or determined at the server device 505 based on story metrics corresponding to the specified content items. In some embodiments, the story metrics are identified as part of the identification of the specified content items at 530. In some embodiments, the story metrics are identified as part of the identification, selection, or determination of the story template at 535. In some embodiments, the identification of the story metrics is separate from the identification of the specified content items and the identification, selection, or determination of the story template.

At 540, other content items to use to process the request for story synthesis are identified at the server device 505 based on the story template. At 545, crawlers are deployed from the server device 505 to the content source 510 to retrieve the other content items. At 550, stores of the content source 510 are searched by the crawlers deployed to the content source 510. At 555, the other content items are identified at the content source 510 as a result of the crawlers searching the stores of the content source 510. At 560, the other content items are retrieved by the transmission of the other content items or data representative thereof from the content source 510 to the server device 505.

Although one content source 510 is shown in FIG. 5, in some embodiments, the crawlers may be deployed at 545 to multiple content sources. In some such embodiments, each of the crawlers may be configured with the same information, such as to retrieve the same target content or the same types of target content. For example, a first crawler and a second crawler may each be configured to crawl social media platforms to retrieve information about the same person or company. In other such embodiments, some of the crawlers may be differently configured, such as to use certain crawlers to retrieve particular information. For example, a first crawler may be configured to crawl social media platforms to retrieve information about a person or company, and a second crawler may be configured to crawl municipal websites for demographic information about a geographic location.

At 565, the story is synthesized at the server device 505 by combining at least some of the specified content items and at least some of the other content items according to the story template. At 570, the synthesized story is transmitted from the server device 505. At 575, the synthesized story is received at the electronic device 500. At 580, the synthesized story is output at the electronic device 500. The particular manner by which the synthesized story is output may depend upon the type or types of media comprising the synthesized story (e.g., text, audio, image, video, etc.), the capabilities of the electronic device 500, or both. For example, in some cases, outputting the synthesized story at 580 may include outputting the synthesized story for display at a display of the electronic device 500.

In some embodiments, a device other than the electronic device 500 may be used within the pipeline. For example, input can be captured at 515 and a request transmitted at 520 from a content device, a personal device, a website, or another start point. In another example, a story can be received at 575 and output at 580 from a content device, a personal device, a website, or another end point. In some embodiments, the server device 505 may be omitted. For example, in such an embodiment, the operations performed at 530-545 and 560-565 can instead be locally performed at the electronic device 500 (or other device, as the case may be). In such an embodiment, the operations performed at 525 and 570 may be omitted.

Figure 6:
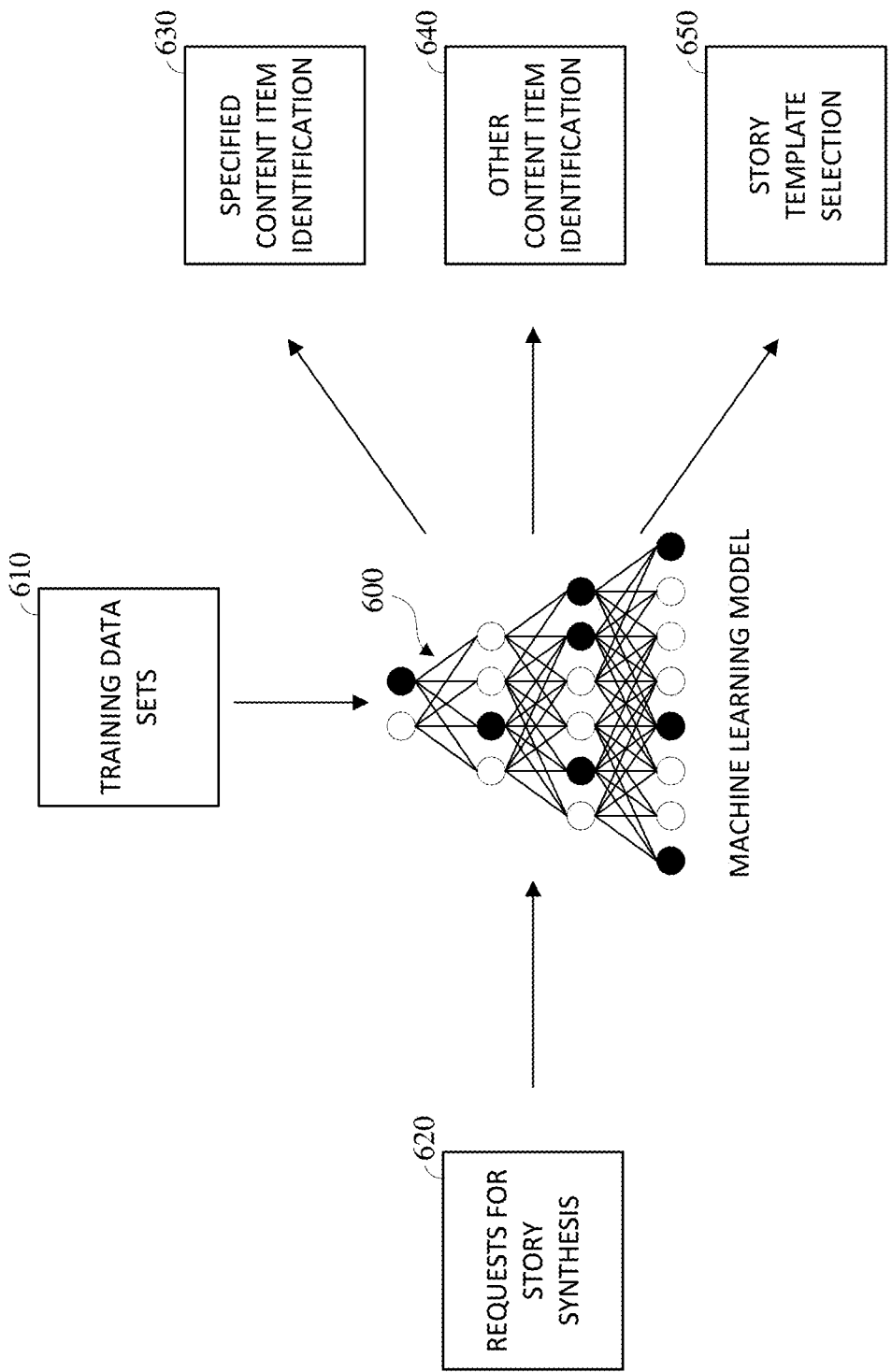
FIG. 6 is a functional block diagram of an example of system intelligence training and inference in accordance with one or more embodiments of this disclosure.

FIG. 6 is a functional block diagram of an example of system intelligence training and inference. A machine learning model 600 may be trained using various input associated with requests for story synthesis and the processing of such requests. The machine learning model 600 may further be used for inference of further requests for story synthesis, such as to identify, select, determine, or otherwise generate aspects associated with the processing of such requests. The machine learning model 600 may be or include one or more of a neural network (e.g., a convolutional neural network, recurrent neural network, or other neural network), decision tree, vector machine, Bayesian network, genetic algorithm, deep learning system separate from a neural network, or other machine learning model. The machine learning model applies intelligence to identify complex patterns in the input and to leverage those patterns to produce output and refine systemic understanding of how to process the input to produce the output.

Training the machine learning model 600 can include inputting training data sets 610 into the machine learning model 600. A training data set 610 may include one or more training data samples. A training data sample may be or otherwise refer to a question asked by a user of an electronic device (or other device, as the case may be), one or more specified contents item, a story template, or one or more other content items used to synthesize a story based on the question asked. For example, in some cases, a training data sample may refer to a combination of one specified content item, one story template, and one other content item. In such an example, the machine learning model 600 can process the sample to understand that the story template was selected based on the specified content item and further that the other content item was retrieved or otherwise identified and used based on the story template. Accordingly, given that a training data set 610 may refer to information involved in the processing of a request for story synthesis, the training of the machine learning model 600 based on the training data set 610 may occur after the processing of the request for story synthesis has been completed.

The machine learning model 600 may perform binary and/or multiclass classification against the samples of a training data set. The particular type of classification may be based on the particular type of training data sample and/or the type of comprehension training. For example, training the machine learning model 600 to recognize a content item as a specified content item or another content item can be done using binary classification. In another example, training the machine learning model 600 to recognize a story metric which corresponds to a specified or other content item can be done using multiclass classification, such as in which each of the multiclass options corresponds to one of the story metrics. The classification may be supervised, such as where the information about the training data samples is known, or unsupervised, such as where such information is unknown. In some embodiments, the classification can be performed using Naïve Bayes, K means clustering, or another approach.

The particular structural change to the machine learning model 600 brought about by the training of the machine learning model 600 using the training data sets 610 may vary based on the type of machine learning model 600 used. For example, training a neural network using the training data sets 610 may include one or more of: adding or removing neurons to one or more layers; adding, removing, or replacing filters applied against neurons on one or more layers, such as based on changes in weight values; or otherwise changing statistical assessments attributed to aspects of the neural network. In another example, training a genetic algorithm using the training data sets 610 may include one or more of: randomly initializing the training data population across a solution domain; processing successive generations of the training data population to produce new generations, including by selecting certain children over others based on a fitness evaluation; applying genetic operators and statistical and/or other mutations and/or crossover; and calculating population diversity, such as using a heuristic-based approach.

Performing inference using the trained machine learning model 600 can include inputting requests for story synthesis 620 into the machine learning model 600. A request for story synthesis 620 input for inference to the machine learning model 600 can be at one or more stages of processing. Depending on the particular stage of processing of the request for story synthesis 620 input for inference, the machine learning model 600 may output one or more different types of output. For example, the machine learning model 600 may output an identification of specified content items 630 where the request for story synthesis is at a stage of processing the input transmitted in connection with the request for story synthesis 620 (e.g., from an electronic device, content device, personal device, or otherwise). In another example, the machine learning model 600 may output a selection of a story template 640 where the request for story synthesis is at a stage of using specified content items to select a story template. In yet another example, the machine learning model 600 may output an identification of other content items 650 where the request for story synthesis is at a stage of retrieving other content items.

In some embodiments, the machine learning model 600 may include a number of processing layers which each perform a different portion of inference. For example, where the machine learning model 600 follows a deep learning approach, an input layer can organize the input, a number of intermediary layers may perform convolution-and-pooling or other processing, and an output layer can produce the output. In the context of a neural network, in such embodiments, each layer may include one or more nodes. In some embodiments, the particular form of the output may be based on the classification technique or techniques used to train the machine learning model 600. For example, where multiclass classification is performed to train based on the training data sets 610, the output may be represented as a vector having a dimensionality corresponding to the number of class options.

In some embodiments, using the machine learning model 600 to output the identification of other content items 650 may include the machine learning model 600 generating customized content items as the other content items. For example, the machine learning model 600 may be trained to recognize which types of other content items to use based on identified specified content items and selected story templates. In the event other content items are not already available to the machine learning model 600 (e.g., because a library accessed by the machine learning model has not yet been populated to include the other content items, because of difficulty in retrieving the other content items (e.g., by crawling one or more content sources), or for other reasons), the machine learning model 600 can leverage its understanding of similar other content items which have been used in similar contexts to generate new other content items. For example, where a request for story synthesis 620 asks the question "what would my life be like if I married John Smith," and limited information about John Smith is available (e.g., due to the inability to access social media accounts for him), the machine learning model 600 may extrapolate upon the limited information available about John Smith to generate new other content items about him.

In some embodiments, modules of a server device used for processing a request for story synthesis may feed input to the machine learning model 600 and/or receive output of inference performed by the machine learning model 600. For example, a request processing module (e.g., the request processing module 325 shown in FIG. 3) may feed a natural language processed input received as a request for story synthesis into the machine learning model 600 and receive an identification of specified content items 630 within the natural language processed input as output from the machine learning model 600. In another example, a data crawling module (e.g., the data crawling module 330 shown in FIG. 3) may feed one or more specified content items into the machine learning model 600 and receive a selection of a story template 640 as output from the machine learning model 600. In yet another example, the data crawling module may feed a story template and one or more specified content items into the machine learning model 600 and receive an identification of other content items 650 as output from the machine learning model.

In some embodiments, the machine learning model 600 can be used in place of modules of a server device used for processing a request for story synthesis. For example, a request for story synthesis 620 received from an electronic device or other device may be directly fed into the machine learning model 600. The machine learning model 600 may then perform each operation involved in processing the request for story synthesis and output a synthesized story to the electronic device or other device.

In some embodiments, the input received by the machine learning model 600 for training purposes may include a user verification of at least a portion of the synthesized story. For example, a user of an electronic device or other device, as the case may be, from which a request for story synthesis is received may be prompted to verify the synthesized story after the outputting of the synthesized story to the electronic device or other device. The verification prompts may include presenting some portions or all of the synthesized story to the user and asking the user to confirm whether the information included in the synthesized story is relevant to the question initially presented by the user to initiate the story synthesis process. A user response to a verification prompt indicating that some or all of a synthesized story is not relevant to the question initially presented may cause portions or all of the synthesized story to not be used to train the machine learning model 600.

Figure 7:
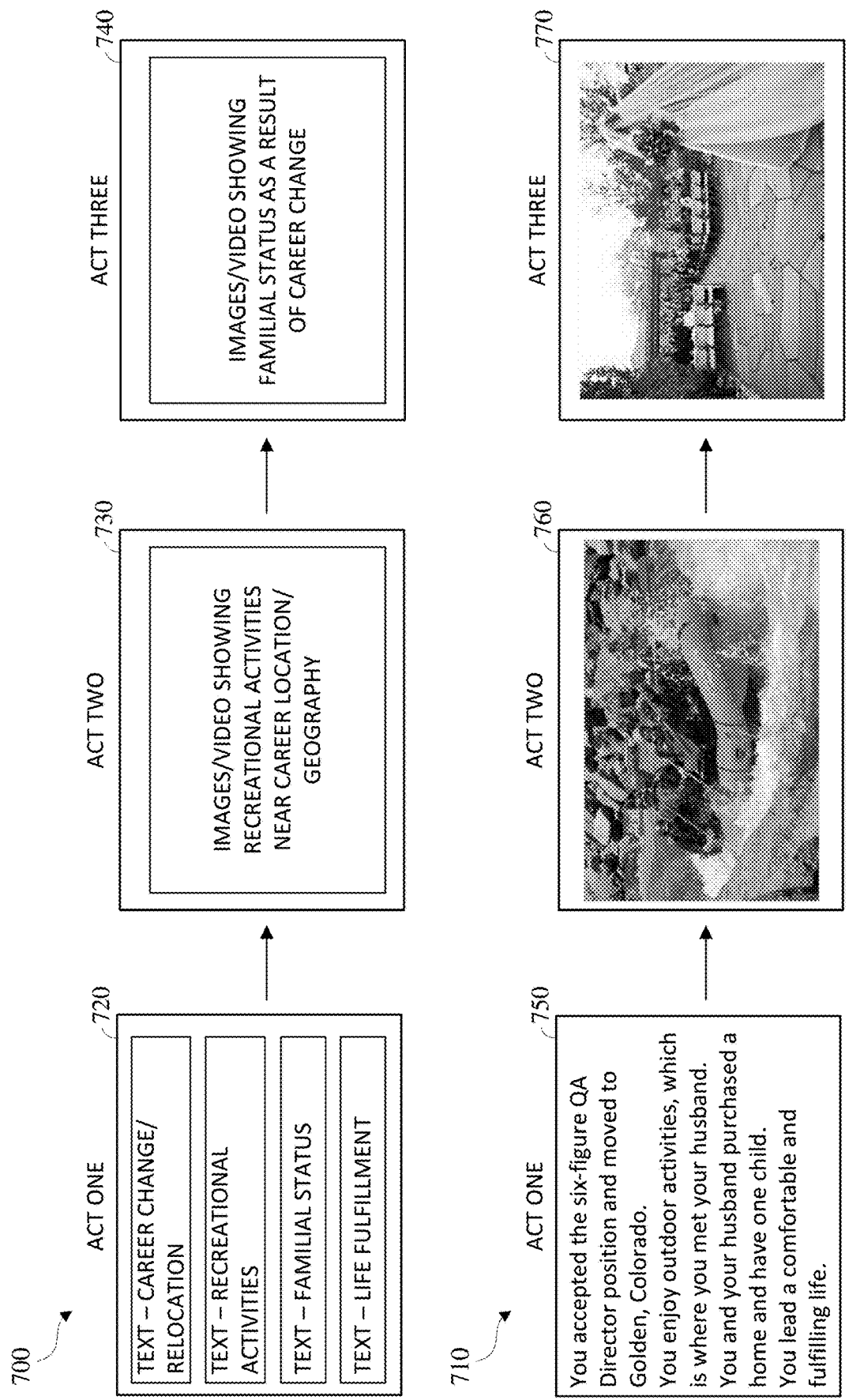
FIG. 7 is an illustration of an example of a story template and a story synthesized according to the story template in accordance with one or more embodiments of this disclosure.

FIG. 7 is an illustration of an example of a story template 700 and a story 710 synthesized according to the story template 700. The story template 700 includes three acts, including act one 720, act two 730, and act three 740. Act one 720 includes several pieces of text information associated with various story metrics. For example, as shown, act one 720 includes text information relating to a career change/relocation, recreational activities, familial status, and life fulfillment. Thus, it may be the case that the story template 700 was selected based on specified content items corresponding to the story metrics of location/geography, career, recreation, and family. For example, the question presented which lead to the selection of the story template 700 may have been "what would my life be like if I accepted the Senior Director job in Golden, Colo.?" Act two 730 includes image and/or video content showing recreational activities near the location of the new career. Act three 740 includes image and/or video content showing familiar status as a result of the career change and relocation.

The story 710 synthesized according to the story template 700 follows the story template 700 and thus includes three acts, including act one 750, act two 760, and act three 770. Act one 750 corresponds to act one 720 and thus includes content items which correspond to the text information set forth in act one 720. For example, act one 750 includes content items of text which recite "You accepted the six-figure QA Director position and moved to Golden, Colo. You enjoy outdoor activities, which is where you met your husband. You and your husband purchased a home and have one child. You lead a comfortable and fulfilling life." Each content item included in act one 750 thus corresponds to one of the text information spaces included in act one 720. Act two 760 corresponds to act two 730 and thus includes image and/or video content as set forth in act two 730. For example, act two 760 includes images and/or a video of people engaged in recreational activities, including whitewater rafting. Act three 770 corresponds to act three 740 and thus includes image and/or video content as set forth in act three 740. For example, act three 770 includes images and/or a video of a family and events important to the family, including a wedding.

Figure 8:
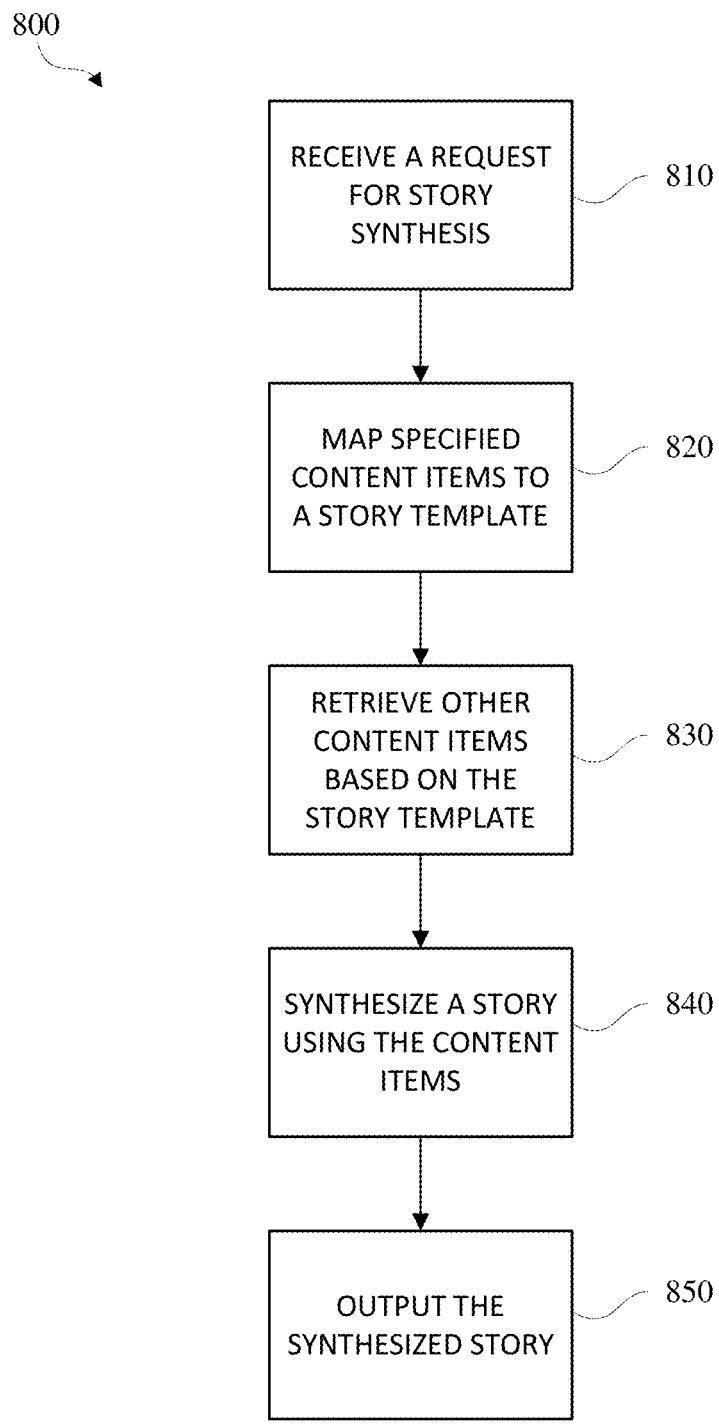
FIG. 8 is a diagram of an example of a method for automated content generation and delivery in accordance with one or more embodiments of this disclosure.

FIG. 8 is a diagram of an example of a method 800 for automated content generation and delivery. The method 800 may include receiving 810 a request for story synthesis. The request for story synthesis is a request to synthesize a story using one or more specified content items. The specified content items may be identified by performing natural language processing against input captured at a device from which the request for story synthesis is received. In some embodiments, the specified content items may be identified after the natural language processing based on syntactic, semantic, morphologic, and/or pragmatic processing.

The method 800 may include mapping 820 specified content items to a story template. Mapping the specified content items to the story template, such as by identifying a story template to use to process the request for story synthesis based on the specified content items can include determining story metrics which correspond to the specified content items and selecting the story template from a set of candidate story templates based on the story metrics. Selecting the story template based on the story metrics can include determining a ranking of the story metrics based on a question presented within the input associated with the request for story synthesis and identifying, as the story template, a candidate story template of the set of candidate story templates which corresponds to the ranking of the story metrics.

The method 800 may include retrieving 830 other content items based on the story template. Retrieving the other content items can include identifying the other content items based on the story template. The other content items are retrieved because they are not included in the request for story synthesis, but the story template signals that those other content items are to be used in the story synthesis based on the request therefor. Retrieval of the other content items based on the story template may include determining the other content items that are to be used to synthesize the story based on the story template. For example, the story template may have N spaces for content in which N-M spaces are attributed to the specified content items and the remainder are not. Those remaining spaces are to be filled with the other content items. The specific types of the other content items may be identified based on story metrics associated with those remaining spaces. Alternatively, or additionally, the specific types of the other content items may be identified based on the locations of the remaining spaces therefor within the story template and/or based on the order of all of the content spaces within the story template. The other content items may be retrieved from content sources by deploying crawlers to those content sources. Alternatively, or additionally, the other content items may be retrieved by generating the other content items. For example, a machine learning model can be trained to generate the other content items based on examples of other content items having similar story metrics (e.g., based on content spaces within the story template).

The method 800 may include synthesizing 840 a story using the specified content items and the other content items. Synthesizing the story using the specified content items and the other content items can include combining at least some of the specified content items and at least some of the other content items according to the story template. The specified content items and the other content items may be combined by determining a sequence for outputting the specified content items and the other content items within the story based on the story template. The specified content items and the other content items can then be temporally arranged according to the sequence.

The method 800 may include outputting 850 the synthesized story. Outputting the synthesized story may include transmitting the synthesized story to an electronic device or other device enabled to output the synthesized story to a user thereof. For example, the synthesized story may be output from the server device by the server device transmitting the synthesized story to an electronic device. The electronic device may, for example, be a smart speaker device configured to output the synthesized story using a speaker or display thereof.

In some embodiments, the method 800 may include storing, within a database or other data store, information associated with the synthesized story. At least a portion of the information associated with the synthesized story may later be retrieved to process a subsequent request for story synthesis. For example, the information stored may be stored within an electronic persona or other record which may be accessed when a second or subsequent request for story synthesis is received from the same electronic device or other device. In another example, the information stored may be stored in a common library or repository for use in processing a request for story synthesis received from the same electronic device or other device or from a different electronic device or other device.

In some embodiments, the method 800 may include capturing input using one or more input components, processing the input to identify a request for story synthesis and one or more specified content items associated with the request for story synthesis, and transmitting a signal representative of the request for story synthesis and the one or more specified content items to a computing device (e.g., a server device). For example, the operations for capturing the input, processing the input, and transmitting the signal as described in the preceding sentence may be performed at an electronic device, a content device, a personal device, or another device before operations are performed for processing the request for story synthesis at the computing device. In some such embodiments, the method 800 may further include receiving a synthesized story from the computing device in response to the transmitted signal and outputting the synthesized story using one or more output components. For example, the operations for capturing the receiving and outputting the synthesized story as described in the preceding sentence may be performed at an electronic device, a content device, a personal device, or another device after operations are performed for processing the request for story synthesis at the computing device.

Although features and elements are described above in particular combinations, one of ordinary skill in the art will appreciate that each feature or element may be used alone or in combination with one or more of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a ROM, a RAM, a register, a cache memory, a semiconductor memory device, a magnetic media, (e.g., an internal hard disc or a removable disc), a magneto-optical media, and an optical media such as a compact disc (CD) or a digital versatile disc (DVD).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    capturing, at an electronic device, an audible signal, wherein the audible signal comprises a query that requires a compilation of existing content items to create a narrative that simulates an answer to the query;
    identifying, based on the query, one or more local content items stored locally on the electronic device comprised of story elements corresponding to the query;
    transmitting, from the electronic device, the query and the one or more local content items to a server device;
    identifying, at the server device, a story template based on the one or more local content items, wherein the story template comprises a sequence of story elements configured to be populated using subcomponents from a content item to create the narrative that simulates the answer to the query;
    deploying, from the server device, crawlers to search one or more content sources for one or more other content items comprising story elements corresponding to the story template;
    retrieving, by the server device, the one or more other content items comprising story elements corresponding to the story template from the one or more content sources in response to the deployment of the crawlers;
    identifying, based on the story template and the query, subcomponents of at least one of the one or more local content items or at least one of the one or more other content items corresponding to story elements of the story template to populate the story template;
    combining, at the service device, the identified subcomponents according to the story template to create the narrative that simulates the answer to the query based on the identified subcomponents corresponding to the story elements;
    transmitting, from the server device, the combined subcomponents to the electronic device; and
    outputting, at the electronic device, the combined subcomponents in response to the query to generate the narrative that simulates the answer to the query.

2. The method of claim 1, wherein the audible signal is processed using natural language processing to identify the one or more specified content items.

3. The method of claim 1, wherein identifying the story template based on the one or more local content items comprises:
    determining one or more story metrics which correspond to the one or more local content items; and
    selecting the story template from a set of candidate story templates based on the one or more story metrics.

4. The method of claim 3, wherein selecting the story template from the set of candidate story templates based on the one or more story metrics comprises:
    determining a ranking of the one or more story metrics based on a question presented within the audible signal; and
    identifying, as the story template, a candidate story template of the set of candidate story templates which corresponds to the ranking of the one or more story metrics.

5. The method of claim 1, wherein the one or more content sources include one or more of a social media platform, a search engine result, a website, a photo gallery, or a local storage.

6. The method of claim 1, wherein combining the identified subcomponents according to the story template comprises:
    determining a sequence for outputting the at least some of the subcomponents of the one or more specified content items and the at least some of the subcomponents of the one or more other content items within the story based on the story template; and
    temporally arranging the at least some of the subcomponents of the one or more specified content items and the at least some of the subcomponents of the one or more other content items according to the sequence.

7. The method of claim 1, further comprising:
    storing, within a database at the server device, information associated with the combined subcomponents, wherein at least a portion of the information associated with the combined subcomponents are later retrieved to process a subsequent query.

8. The method of claim 1, wherein the electronic device is a smart speaker device, wherein outputting the combined subcomponents comprises:
outputting the combined subcomponents for display at a display of the smart speaker device.

9. A method, comprising:
receiving, from an electronic device, a request to combine one or more local content items to generate a new combined content item based on a story template to create a narrative that simulates an answer to the request a sequence of story elements configured to be populated using subcomponents from a content item to create the narrative that simulates the answer to the request;
mapping the one or more local content items to a story template available in memory, wherein the story template comprises a sequence of story elements configured to be populated using subcomponents from a content item to create the narrative that simulates the answer to the query;
retrieving, based on the story template, one or more other content items comprised of subcomponents related to the one or more local content items from one or more content sources required to complete the story template;
identifying, based on the story template, subcomponents of the one or more local content items and the one or more other content items required to populate the story template;
combining the identified subcomponents according to the story template to create the narrative that simulates the answer to the request based on the identified subcomponents corresponding to the story elements; and
outputting the combined subcomponents for display at the electronic device in response to the request to generate the narrative that simulates the answer to the request.

10. The method of claim 9, wherein the electronic device is a smart speaker device and the request is based on input received at the smart speaker device.

11. The method of claim 10, wherein the input received at the smart speaker device is processed using natural language processing to identify the one or more local content items.

12. The method of claim 9, wherein the one or more content sources includes a website, wherein retrieving the one or more other content items related to the one or more local content items from the one or more content sources comprises:
crawling the website for the one or more other content items.

13. The method of claim 12, wherein the website is associated with a social media platform, wherein crawling the website for the one or more other content items comprises:
accessing an account of the social media platform to retrieve at least one of the one or more other content items.

14. The method of claim 9, wherein the one or more content sources includes a machine learning model, wherein retrieving the one or more other content items related to the one or more local content items from the one or more content sources comprises:
using the machine learning model to generate at least some of the one or more other content items.

15. The method of claim 14, further comprising:
training the machine learning model using information associated with the combined subcomponents.

16. The method of claim 15, wherein the information associated with the combined subcomponents includes at least one specified content item of the one or more local content items, the story template, and at least one other content item of the one or more other content items.

\* \* \* \* \*